(12) United States Patent
Abrams

(10) Patent No.: US 12,288,126 B1
(45) Date of Patent: Apr. 29, 2025

(54) DIGITAL INFORMATION CAPTURE SUN VISOR SYSTEM AND METHOD OF IMPLEMENTATION

(71) Applicant: Mitchell Abrams, New Rochelle, NY (US)

(72) Inventor: Mitchell Abrams, New Rochelle, NY (US)

( * ) Notice: Subject to any disclaimer, the term of this patent is extended or adjusted under 35 U.S.C. 154(b) by 327 days.

(21) Appl. No.: 17/991,277

(22) Filed: Nov. 21, 2022

Related U.S. Application Data

(63) Continuation-in-part of application No. 16/926,250, filed on Jul. 10, 2020, now abandoned.

(60) Provisional application No. 63/000,648, filed on Mar. 27, 2020.

(51) Int. Cl.
| | |
|---|---|
| *G06K 7/00* | (2006.01) |
| *B60J 3/02* | (2006.01) |
| *B60K 35/00* | (2006.01) |
| *G06K 7/10* | (2006.01) |
| *G06K 7/14* | (2006.01) |
| *B60K 35/28* | (2024.01) |
| *B60K 35/60* | (2024.01) |

(52) U.S. Cl.
CPC .......... *G06K 7/1095* (2013.01); *B60J 3/0204* (2013.01); *B60K 35/00* (2013.01); *G06K 7/1404* (2013.01); *B60K 35/28* (2024.01); *B60K 35/60* (2024.01); *B60K 2360/176* (2024.01); *B60K 2360/777* (2024.01)

(58) Field of Classification Search
CPC ....... G06V 20/56; B60J 3/0204; G06K 7/143; G06Q 30/0266
See application file for complete search history.

(56) References Cited

U.S. PATENT DOCUMENTS

| | | | | |
|---|---|---|---|---|
| 9,712,741 | B2 * | 7/2017 | Kothari | G06V 20/597 |
| 10,343,486 | B2 * | 7/2019 | Chundrlik, Jr. | H04N 7/181 |
| 10,437,937 | B2 * | 10/2019 | Kilaru | G06F 3/0652 |
| 10,486,505 | B2 * | 11/2019 | Lee | B60R 11/04 |
| 10,657,343 | B1 * | 5/2020 | Studnicka | G06Q 20/40 |

(Continued)

*Primary Examiner* — Md K Talukder
(74) *Attorney, Agent, or Firm* — Collard & Roe, P.C.

(57) ABSTRACT

A method for capturing digital information on a surface of a sun visor for use by an operator and a passenger, includes the steps of:
  deploying the sun visor in a vehicle for:
    storing accessible digital information;
    selecting stored the digital information;
    accessing selected the digital information;
    capturing selected the digital information on the surface of the sun visor for having captured digital information, the surface of the sun visor having a light absorbing technology providing a super black surface;
    retrieving selected the captured digital information;
    transmitting selected retrieved the captured digital information;
    receiving selected retrieved the captured digital information;
    converting selected retrieved the captured digital information into a form able to be read by the operator or a passenger; and,
  displaying selected retrieved the captured digital information in the form able to be read on the surface on the sun visor. Preferably, the step of converting selected retrieved the captured digital information into a form able to be read by the operator or a passenger includes use of a scanner.

3 Claims, 6 Drawing Sheets

(56) References Cited

U.S. PATENT DOCUMENTS

| | | | |
|---|---|---|---|
| 2006/0089185 A1* | 4/2006 | Han | B60R 25/33 |
| | | | 455/575.1 |
| 2015/0360618 A1* | 12/2015 | Richard | B60R 11/0252 |
| | | | 348/148 |
| 2016/0300050 A1* | 10/2016 | Hecht | H04W 12/06 |
| 2017/0013188 A1* | 1/2017 | Kothari | H04N 23/62 |
| 2018/0236849 A1* | 8/2018 | Lee | B60R 1/10 |
| 2019/0366981 A1* | 12/2019 | Huang | B60R 25/252 |
| 2020/0073520 A1* | 3/2020 | Mohan | G06Q 30/0235 |
| 2020/0090224 A1* | 3/2020 | Falconer | G02B 27/0179 |
| 2020/0180560 A1* | 6/2020 | Okada | B60R 25/305 |
| 2020/0324651 A1* | 10/2020 | Ford | B60K 35/00 |
| 2020/0402480 A1* | 12/2020 | Ueda | G09G 5/00 |
| 2021/0108926 A1* | 4/2021 | Tran | G06T 17/05 |
| 2021/0150577 A1* | 5/2021 | Hacker | G06Q 30/0241 |

* cited by examiner

DIGITAL INFORMATION CAPTURE SUN VISOR SYSTEM AND METHOD OF IMPLEMENTATION

CROSS-REFERENCE TO RELATED APPLICATIONS

This is a continuation-in-part of U.S. patent application Ser. No. 16/926,250, filed Jul. 10, 2020, which claims domestic priority under 35 U.S.C. § 119(e) from U.S. Provisional Patent Application Ser. No. 63/000,648, filed Mar. 27, 2020, the entire disclosure of which shall be deemed to be incorporated by reference herein.

BACKGROUND OF THE INVENTION

Technical Field of the Invention

The present invention relates generally to a method to enabled a motor vehicle sun visor system and, more specifically, to a motor vehicle sun visor surface that, when deployed, captures, reads, scans, absorbs, interprets, translates and, when called upon, displays, in real time, digitally captured content disseminated by digital data providers whether in goods, products and service presentations, institutional messaging, information to be presented for the education, enrichment whether commercial, educational, religious, secular, informational, enrichment of both driver and passenger.

More particularly, gathered digitally captured information is scannable, readable and/or viewable and able to be interpreted by products and services displayed and wlhich appear on the visor's horizon for the benefit of the driver and/or passengers, separately or in unison. Further, when the visor surface is deployed sideways, it can capture all content and data running along either side of the motor vehicle for the benefit of both the driver and passengers.

Description of the Prior Art

The following United States patents pertain, generally, to vehicle sun visors: U.S. Pat. Nos. 9,712,741; 9,975,407; 10,336,263; 10,343,486; 10,373,504; 10,436,600; 10,442,295; 10,473,937; 10,486,505; 10,489,106; 10,507,710; 10,513,184; and 10,518,612. While the sun visors disclosed in the foregoing prior art references may be suitable for the purposes for which they were intended, it is submitted that such prior art sun visors are not pertinent to a sun visor that captures, displays and transmits digital data.

Additionally, the inventor is also aware of Falconer et al., U.S. Patent Application Publication No. 2020/0090224 A1, however this prior art reference does not display digital information on the sun visor of a vehicle, but, instead, displays the information on the windshield of the vehicle, thereby rendering entirely unnecessary, as redundant, any suggested teaching of displaying information on the sun visor.

Further, Kothari, U.S. Patent Application Publication No. 2017/0013188 A1, teaches a sun visor having a video feed display and is, in effect, a camera acting as a sun visor.

Significantly, the present invention does not use a camera as does Falconer et al. and Falconer, but utilizes a light absorbing surface to capture signals emanating from an LED source. Optionally, a scanner may then be used to convert the captured signals into readable form.

SUMMARY OF THE INVENTION

A primary object of the present invention is to enable a vehicle sun visor to function both as a sun/glare blocking device and a surface, when deployed, captures digital information for the benefit of operator and/or passenger.

A further significant object of the present invention is to enable a vehicle sun visor system to function as a digital data and content capture device.

An additional object of the present invention is to provide a vehicle sun visor device with the capability to capture and provide captured information to the driver and/or passenger in real time.

A further object of the invention is not to rely on satellite enabled systems or mobile phone capabilities.

Another object of the present invention is to provide on the surface of the vehicle sun visor to read and interpret all posted and perceived conditions and a reader that reads the road information such as speed limits, road traffic conditions, Amber alerts, etc.

A further object of the present invention is to activate captured data and information onto a display by deploying the visor from its' stored position so that the surface containing displayed information is visible by the driver.

Yet, another object of the present invention is to activate captured data and information onto a display by flipping down the vehicle sun visor from its stored position so that the display is visible by a passenger.

An additional object of the present invention is to activate captured data and information onto a display by flipping down the vehicle sun visor from its stored position and pointed directly in front horizon of the vehicle.

A further object of the present invention is to activate captured data and information onto a display by flipping down the vehicle sun visor from its stored position and unclipping and angled so that the surface is deployed sideways and angled on both driver and passenger sides so that the surface can capture all data and content being presented on the sides of the motor vehicle.

Yet another object of the present invention is to scan digital data and the scanned data to be accessible from the vehicle sun visor.

An additional object of the present invention is to gather digital data and the gathered data to be accessible from the vehicle sun visor.

A further object of the present invention is to read digital data and the read data to be accessible from the vehicle sun visor.

The foregoing and related objects are accomplished by the method of the present invention for capturing digital information on a sun visor for use by a vehicle operator, passenger or other person, which includes the steps of providing light emitting element, e.g., light emitting diodes, storing accessible digital information, selecting digital information that has been stored, accessing selected digital information, capturing selected digital information, retrieving selected digital captured information, transmitting selected retrieved captured digital information, receiving selected retrieved captured digital information, converting selected retrieved captured digital information into readable form, and displaying selected retrieved captured digital information into readable form and potentially save for later consummation.

More particularly, gathered digitally captured information is scannable, readable and viewable, and interpreted by goods and services displayed that appear on the visor's horizon for the benefit of the driver and/or passengers, separately or in unison. Further, when the visor surface is deployed sideways, it can capture all content and data running along either side of the motor vehicle for the benefit of both the driver and any passengers The sun visor system is activated by deploying the sun visor from its stored position and moving the sun visor system to the position normally used to block sun glare and/or bright, potentially blinding light from oncoming headlight high beams. Important-ly, when activated, the driver has an unobstructed view of captured and displayed information without moving his or her head, thus maintaining an uninterrupted view of the road without needing to engage a cell phone, satellite or camera, thereby providing "passive absorption" for capturing the data and content that becomes the property owned by the driver and/or passengers to be shared, disseminated or sold at the discretion of the driver and/or passengers.

More specifically, the system will absorb, recognize, capture, and disseminate a data signal when delivered, preferably, by light emitting diode ("LED"), solar-infused light technologies powering QR, BAR, ORB or other method code (Quick Response Code), a bar code, an ORB visor code, a linear wave light ingesting system for surface absorption, or an infused floating data scan, as well as devices authorized for use from other sources.

When digital data is captured, the surface absorbing technologies (including, but not limited to, Vantablack, a super black spray coating, vertically aligned nanotube arrays merged with the color black, and coal-ingested carbon nanotubes) will capture and digest digital content as described. Vantablack is a brand name or trademark for a class of black coatings with total hemispherical reflectances (THR) below 1.5% in the visible spectrum. The coatings were first publicly unveiled in 2014 and commercialized by the scientific team from Surrey NanoSystems. The original Vantablack coating was grown from a chemical vapor deposition process (CVD) and is claimed to be the "world's darkest material," absorbing up to 99.965% of visible light perpendicular to the material at 663 nm. The coatings are unique in that they are not only "super black," but that they retain uniform light absorption from almost all viewing angles.

It is a significant purpose of the present invention to recognize, gather and incorporate retrieved targeted data in a digital language promulgated by the horizon outside the motor vehicle and displaying in real time, or gathered for analysis and review onto the readable surface.

It is a related purpose of the claimed invention to gather content to benefit the driver and/or passengers of a given motor vehicle and to later organize and disseminate gathered content for the enrichment, benefit, consumer opportunity and pleasure choice of the driver and/or passengers. What is gathered can be selected, allowed or disallowed, designated or rejected to be retained and utilized, what the driver or passengers gather for their benefit.

Other objects and features of the present invention will become apparent when considered in combination with the accompanying drawing figures, which illustrate certain preferred embodiment of the present invention. It should, however, be noted that the accompanying drawing figures are intended to illustrate only select preferred embodiments of the claimed invention and are not intended as a means for defining the limits and scope of the invention.

BRIEF DESCRIPTION OF THE DRAWING FIGURES

In the drawing figures, wherein similar features are denoted with similar reference numerals throughout the several views.

Figure 5:
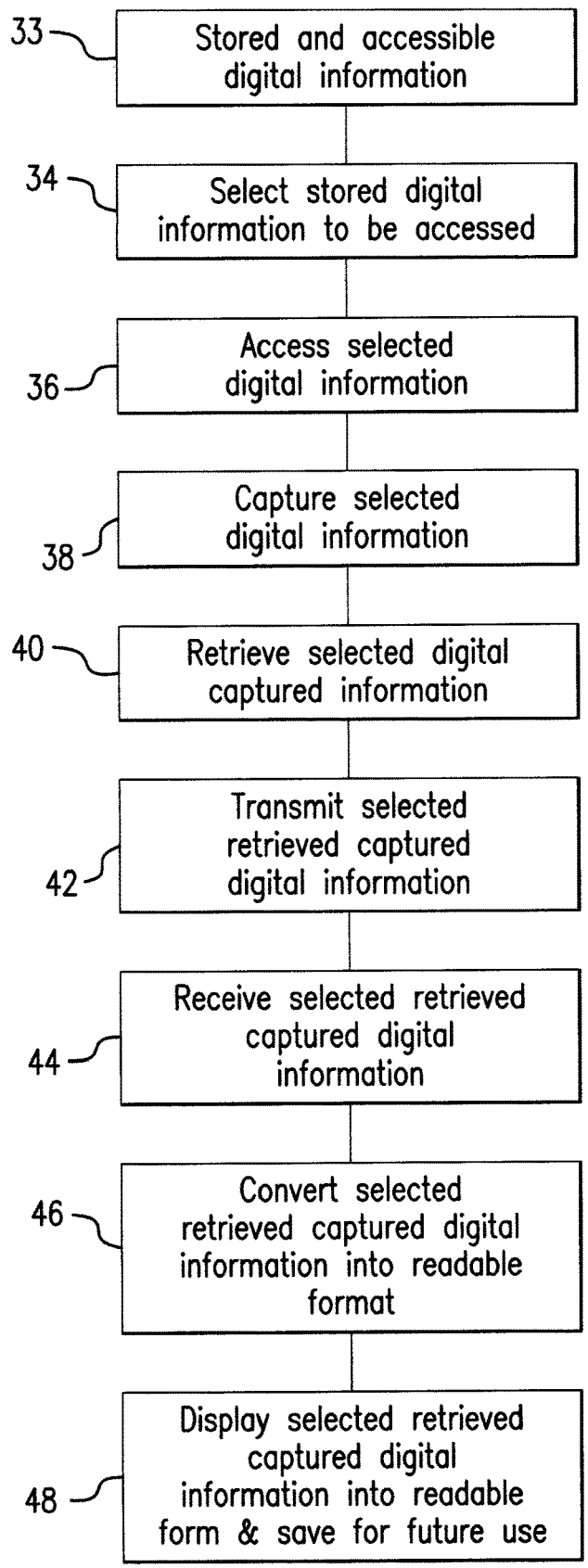
Figure 6:
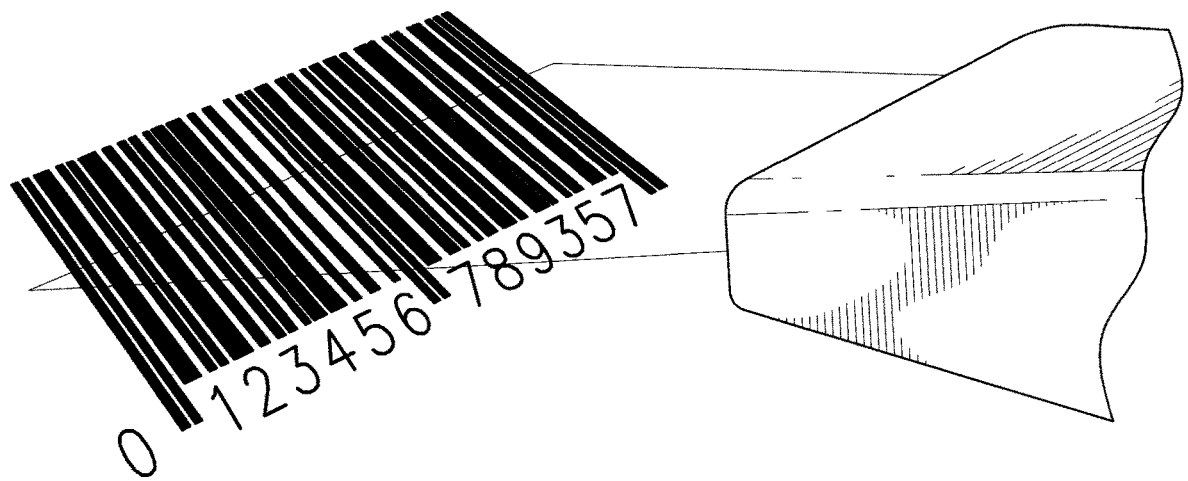

FIG. 5 of the digital capture sun visor surface indicates the major steps to implement and use the features for practicing the method of the present invention; and, FIG. 6 of the digital capture sun visor surface shows the surface data capture scanning reader for practicing the method of the present invention.

DESCRIPTION OF THE REFERENCED NUMERALS

Turning now descriptively to the drawings, in which similar reference characters denote similar elements throughout the several views, the figures illustrate the use of the present invention. With regard to the reference numerals used, the following numbering is used throughout the various drawing figures:

10 subject invention
12 driver's digital capture sun visor device in the stored position and when deployed its surface absorbing technologies, e.g., Vantablack, a super black coating, vertically aligned nano tube arrays merged with the color black, and coal-ingested carbon nanotubes, will capture and digest digital content
14 passenger's digital capture sun visor device in the stored position and, when deployed, its surface absorbing technologies, e.g., Vantablack, a super black coating, vertically aligned nanotube arrays merged with the color black, and coal-ingested carbon nanotubes, will capture and digest digital content
16 driver's digital capture sun visor surface in the deployed position to expose a readable surface
18 passenger's digital capture sun visor device in the deployed position to expose a readable surface
20 digital capture sun visor device accessing and capturing digital information from roadside signage
22 digital capture sun visor device transmitting captured digital information on information on to readable surface
24 digital capture sun visor device accessing and capturing digital information
26 digital capture sun visor device transmitting captured digital information onto readable surface
28 digital capture sun visor device accessing and capturing digital information
30 digital capture sun visor device transmitting captured digital information onto readable surface
32 driver's and passengers' viewable surface of digital captured and received digital information
33 stored and accessible digital information 34 selection of desired information to be accssed captured, transmitted and received
36 access digital selected information
38 capture selected digital information
40 retrieve digital selected captured information
42 transmit selected received captured digital information
44 receive selected retrieved captured digital information
46 convert received selected captured digital information into readable form
48 display selected retrieved captured digital information into readable form onto a readable surface for driver's and/or passengers use

DETAILED DESCRIPTION OF THE DRAWING FIGURES AND PREFERRED EMBODIMENTS

Figure 1:
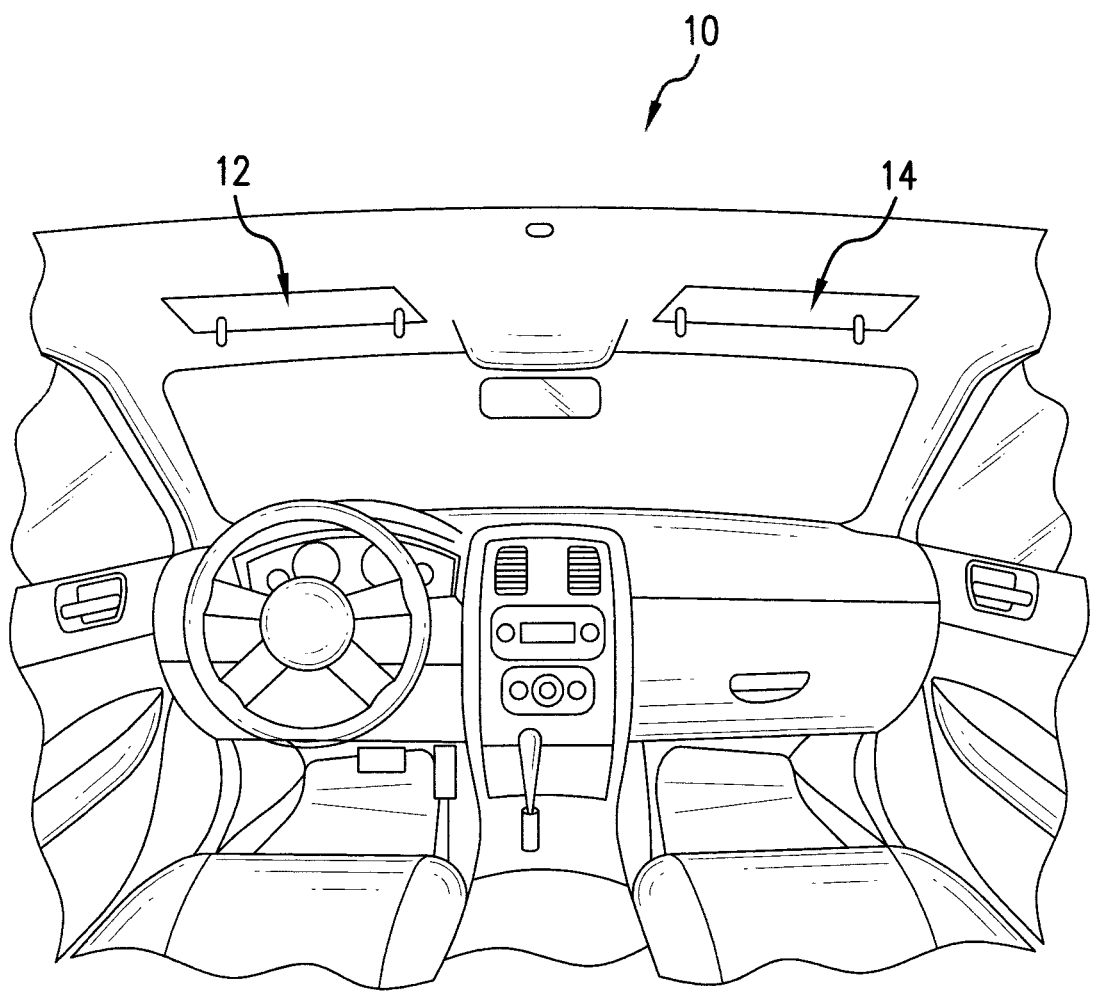
FIG. 1 is perspective view of the digital capture sun visor surface device in the stored position with the viewable surfaces out of view of the vehicle operator and passenger for practicing the method of the present invention.

Turning now, in detail, to an analysis of the accompanying drawing figures, referring to FIG. 1 shown is front interior passenger cabin of a motor vehicle and may be an automobile, recreation vehicle, truck and/or camper. When not in use and not deployed driver's digital capture sun visor surface device 12 located in front of the vehicle's driver is shown in the stored position. A passenger's digital capture sun visor surface device 14 is located in front of a passenger and is shown not in use and in the un-deployed stored up position.

For both sun visor surface device 12 for the driver and the digital capture sun visor surface device 14 for the front seat passenger, when these sun visors are deployed their respective surface absorbing technologies, e.g., Vantablack, a super black coating, vertically aligned nano tube arrays merged with the color black, and coal-ingested carbon nanotubes, will capture and digest digital content available to it.

Figure 2:
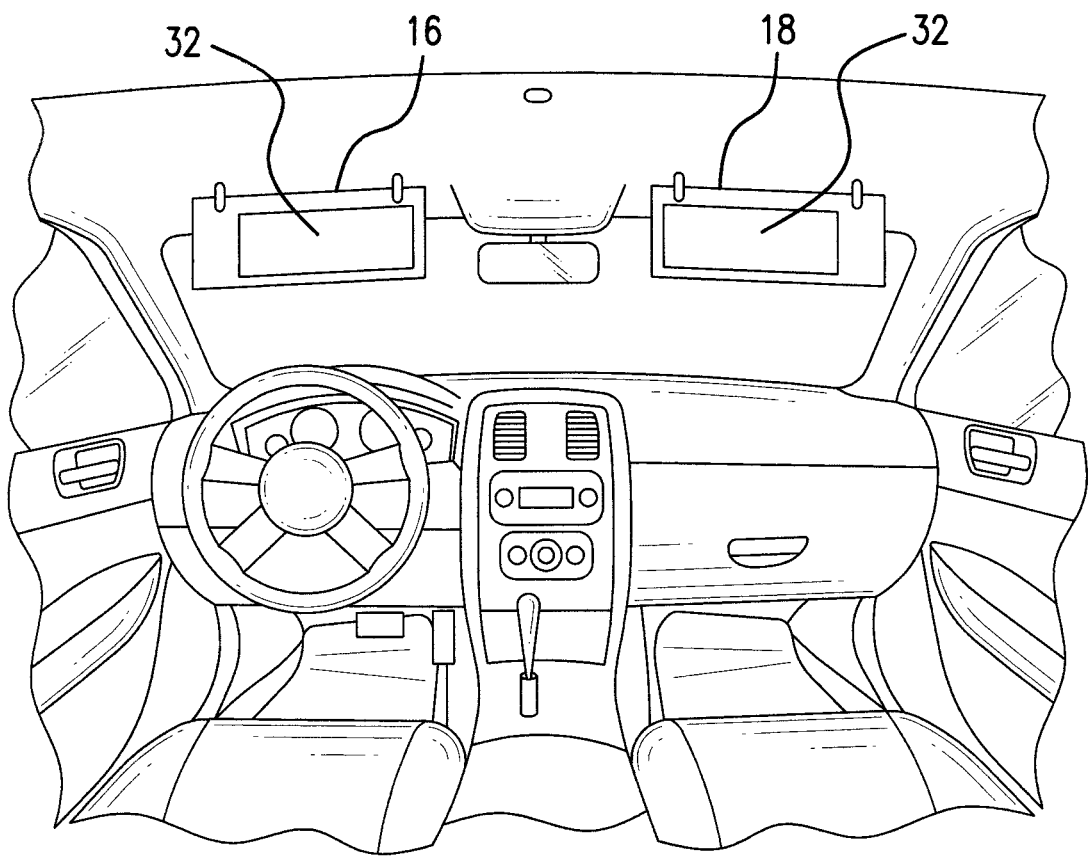
FIG. 2 is perspective view of the digital capture sun visor surface device in a position with the viewable surface viewable by the vehicle operator and passenger for practicing the method of the present invention.

As illustrated in FIG. 2, the driver's digital capture device 16 is deployed to down position 16 so that surface 32 is visible to the driver. Similarly, the passenger's digital capture sun visor 18 is deployed to a down position so that surface 32A is viewable by the passenger. Deploying passenger's sun visor 12 and/or passenger's sun visor device 14 activates either or both so that digital captured information is displayed in readable form.

Figure 3:
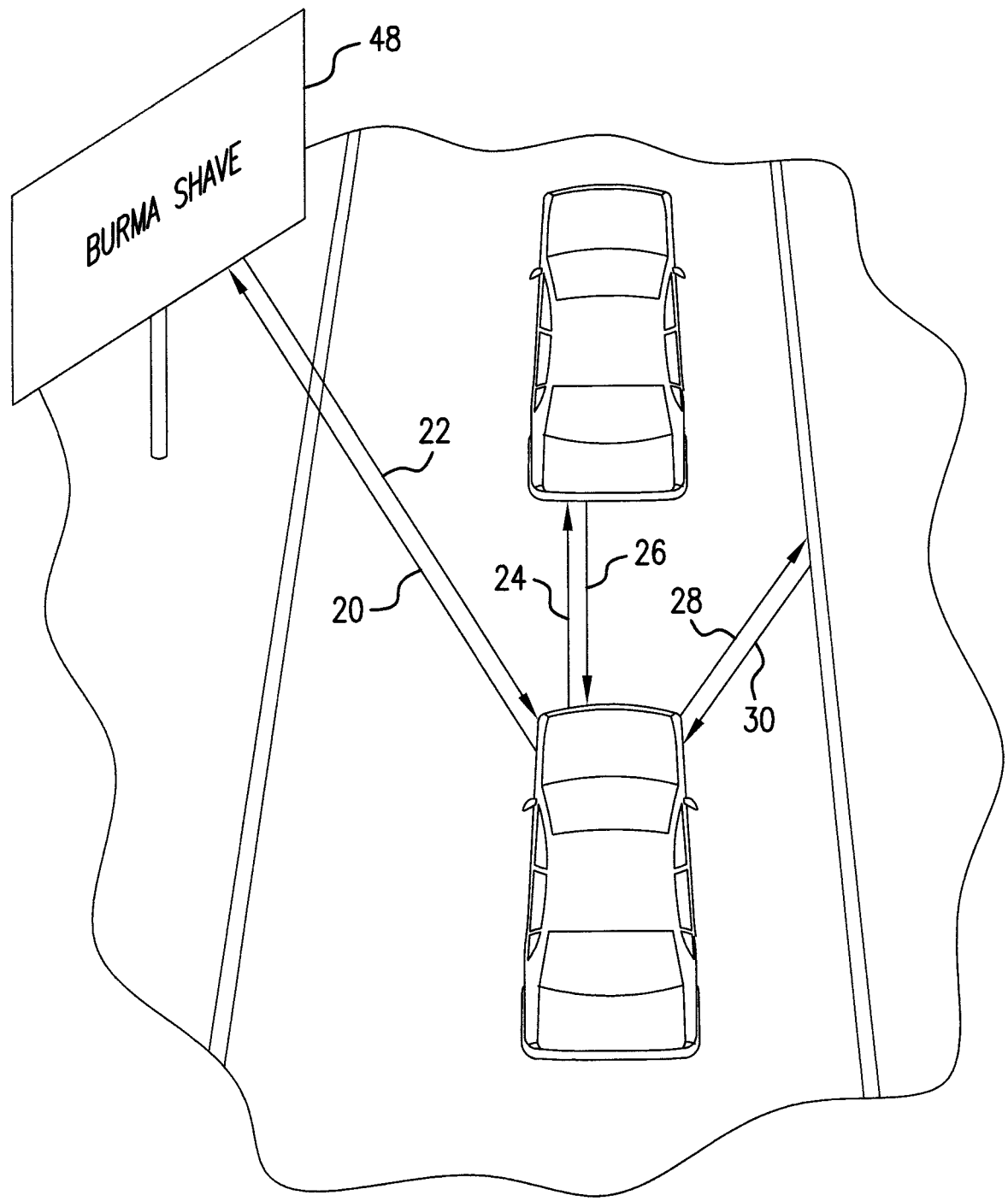
FIG. 3 is perspective view of the digital capture sun visor surface device capturing, retrieving and transmitting digital information to the viewable surface for practicing the method of the present invention.

FIG. 3 illustrates the digital sun visor surface device accessing and capturing digital information 20 from road sign 48 and then transmitting the captured information 22 to driver's and or passenger's readable surface 32 and/or passenger's surface 32A. Preferably, a scanner (not shown) scans information received on visor surfaces 12, 14 and converts the scanned information into readable form.

Figure 4:
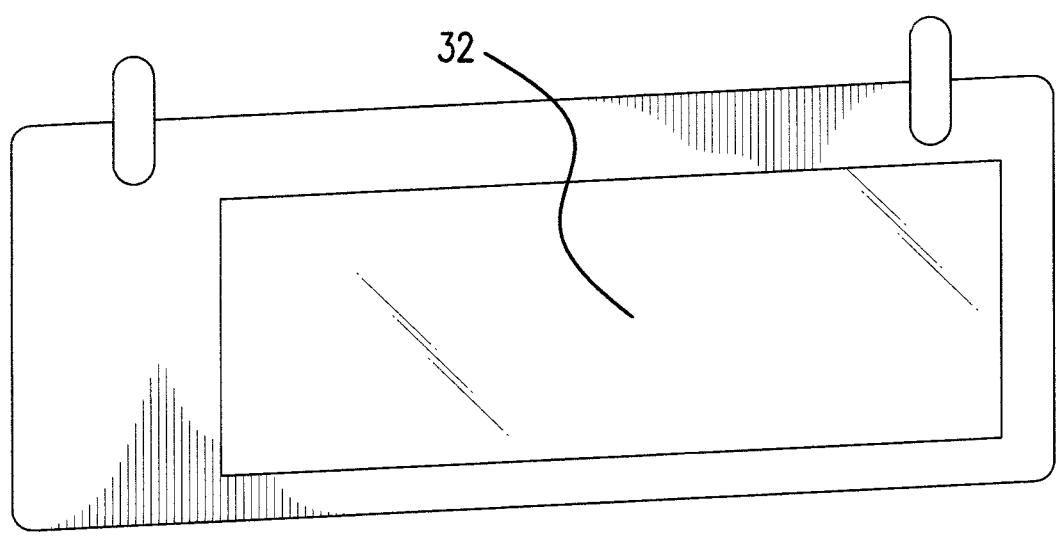
FIG. 4 is perspective view of the digital capture sun visor surface device with the readable surface displaying capturing digital information and is available to the vehicle operator and passengers used for practicing the method of the present invention.

FIG. 4 illustrates the readable surface where the captured digital information may be viewed.

FIG. 5 indicates the main steps required for the functioning of the invention and indicates stored and accessible digital information 33, indicates the step to select stored digital information to be accessed 34, the step to access selected stored information 36, the step to capture digital information 38, the step to retrieve digital captures information 40, the step to transmit retrieved captured digital information 42, the step to retrieve captured digital information 44, the step to convert retrieved captured digital information into readable format 46 and the step to display retrieved captured digital information into readable form 48.

FIG. 6 of the digital capture sun visor shows a preferred embodiment with the surface of the sun visor having a capture scanning reader.

While only several embodiments of the present invention have been shown and described, it will be obvious to those skilled in the art that many modifications may be made to the present invention without departing from the spirit and scope thereof.

What is claimed is:

1. A method for capturing digital information on a surface of a sun visor for use by an operator and a passenger, comprising the steps of:
    deploying the sun visor in a vehicle for:
        storing accessible digital information;
        selecting stored said digital information;
        accessing selected said digital information;
        capturing selected said digital information on the surface of the sun visor thereby having captured digital information, the surface of the sun visor having a light absorbing technology providing a super black surface comprising a super-black spray coating, vertically aligned nano tube arrays merged with the color black, or coal-ingested carbon nanotubes, that perform the step of capturing by absorbing the digital information into the super black surface;
    retrieving selected said captured digital information;
    transmitting selected retrieved said captured digital information;
    receiving selected retrieved said captured digital information;
    converting selected retrieved said captured digital information into a readable form by a scanner; and,
    displaying selected retrieved said captured digital information in said readable form on a readable surface on the sun visor.

2. The method for capturing digital information on a sun visor for use by an operator and a passenger according to claim 1, wherein said step of deploying the sun visor in the vehicle is performed by deploying the sun visor in a sideways manner.

3. The method for capturing digital information on a sun visor for use by an operator and a passenger according to claim 1, further comprising the step of saving said captured digital information in said readable form for viewing at a later time.

\* \* \* \* \*